United States Patent

Kleemann et al.

[11] Patent Number: 5,533,777
[45] Date of Patent: Jul. 9, 1996

[54] ACTUATION MECHANISM FOR A TOP AND A TOP RECEPTACLE COVER OF A MOTOR VEHICLE

[75] Inventors: Klaus Kleemann, Birkenfeld; Herbert May, Neudenau; Matthias Aydt, Eberdingen; Kurt Pfertner, Winsheim; Alexander Zeissner, Illingen; Peter Thomas, Tiefenbronn, all of Germany

[73] Assignee: Dr. Ing. h.c.F. Porsche AG, Germany

[21] Appl. No.: 328,757

[22] Filed: Oct. 24, 1994

[30] Foreign Application Priority Data

Oct. 23, 1993 [DE] Germany ............... 43 36 278.8

[51] Int. Cl.$^6$ ............................................. B60J 7/12
[52] U.S. Cl. .......................... 296/117; 296/107; 296/136
[58] Field of Search ................................ 296/107, 117, 296/136

[56] References Cited

U.S. PATENT DOCUMENTS

| | | | |
|---|---|---|---|
| 1,437,351 | 11/1922 | Oelsner | 296/117 |
| 1,926,757 | 9/1933 | Tendero | 296/117 |
| 2,007,873 | 7/1935 | Paulin | 296/117 |
| 2,105,293 | 1/1938 | Paulin | 296/117 X |

FOREIGN PATENT DOCUMENTS 358286  1/1921  Germany.
399011  10/1933  United Kingdom.

*Primary Examiner*—Joseph D. Pape
*Attorney, Agent, or Firm*—Evenson, McKeown, Edwards & Lenahan

[57] ABSTRACT

An actuating device for a motor vehicle top and a top receptacle cover comprises an actuating lever and a displacement device. By way of the actuating lever which can be pivoted from the driver's seat, the top receptacle cover can be moved between a closed position and an open position and the top between a second operating position and a third operating position. To further improve such an actuating device so that with a simple construction it functions well, avoids errors in manipulation and is easily manipulated, the actuating lever is pivoted in a first direction such that the top receptacle cover is moved from a closed position into an opened position. Consequently, a first coupling element, which is in operative connection with the displacement device, takes up a receiving position in which a second coupling element provided on the top can engage the first coupling element when the top is in the second operating position. By renewed pivoting of the actuating lever in a second, reverse direction, the top receptacle cover and the top are moved downwardly together into the closed position and the third operating position by the engaged coupling.

26 Claims, 15 Drawing Sheets

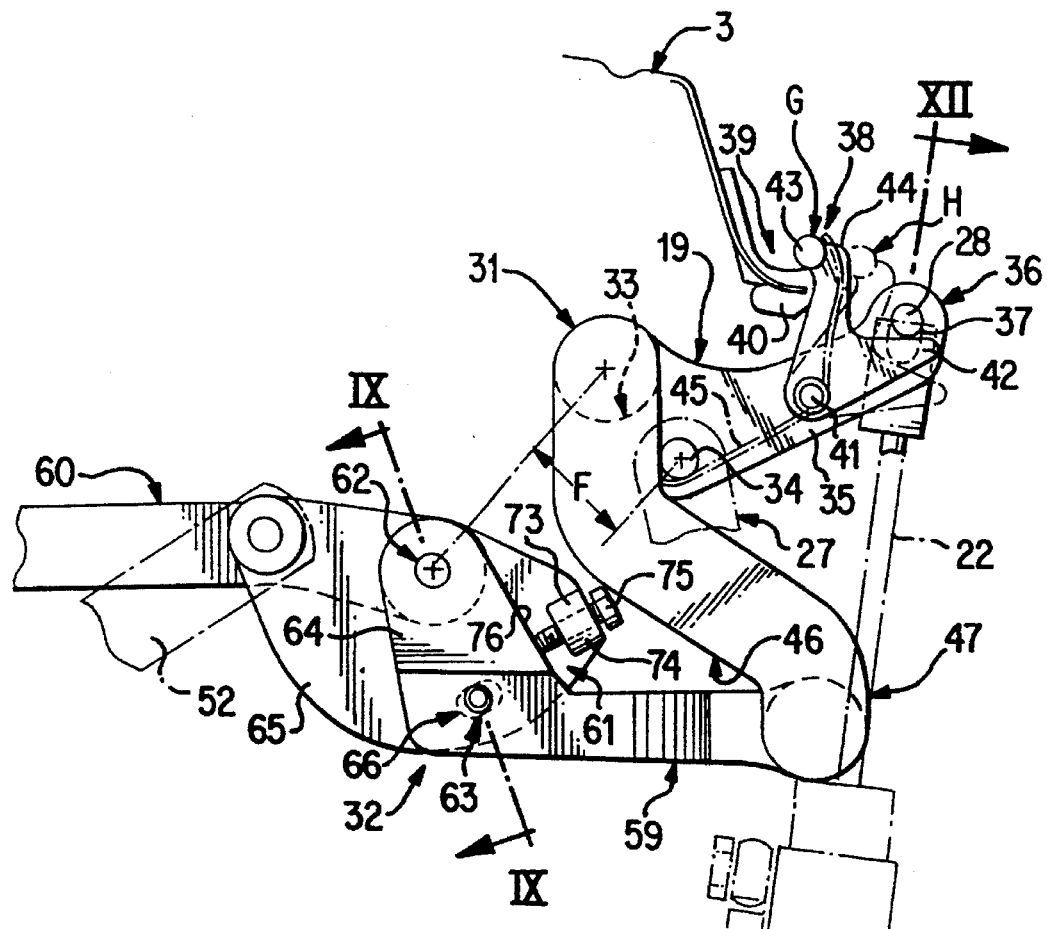
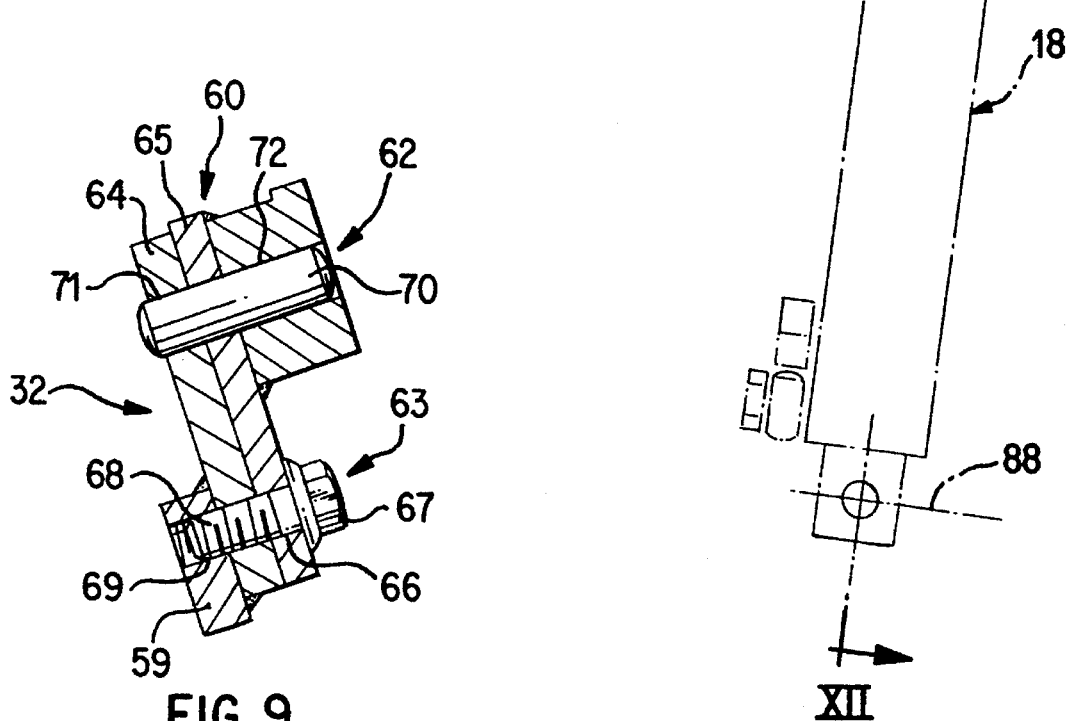
FIG. 9
FIG. 8

ACTUATION MECHANISM FOR A TOP AND A TOP RECEPTACLE COVER OF A MOTOR VEHICLE

BACKGROUND AND SUMMARY OF THE INVENTION

The present invention relates to an actuation mechanism for a top and a top receptacle cover of a motor vehicle so that, from the driver's seat position, the top receptacle cover can be moved between a closed position and an open position, and the top can be moved between a second operating position and a third operating position by a pivotable actuating lever and a displacement device.

In a known actuation mechanism of the type described in German Patent DE-PS 358 286, a first actuating lever is situated on the floor next to the driver's seat and is connected via traction cables and elbow levers with a first displacement device. This displacement device, which acts on the main hoop of the top is formed by two toothed segments which are in engagement with each other. A second actuating lever is located on the first actuating lever for moving the top receptacle cover, which is connected via traction cable segments with rotatably seated elbow levers. Each elbow lever is connected via a cable to a further rotatably seated elbow lever.

Both elements of the two-piece top receptacle cover are seated via pivot arms on the body, and connecting rods are provided between the two pivot arms. In addition to the connecting rod, an elbow, which is connected via a push rod with the elbow lever with the aid of the guide journal, also acts on a crank of the pivot arm. The guide journal engages a slot of the lower-lying toothed segment.

This actuation mechanism has an elaborate construction, because separate displacement devices with separate actuating levers are required for the top receptacle cover as well as for the top. Furthermore, the two-piece configuration of the top receptacle cover entails a large effort in construction and in seating it on the body.

In addition, it is necessary with the known actuating mechanism to make available suitable structural space inside the passenger compartment for the individual components, in particular for the straight extending traction cables, due to which the free design of the interior of the passenger compartment is hampered.

It is an object of the present invention to provide an actuation mechanism for a top and a top receptacle cover of a motor vehicle such that, along with a simple construction, it operates in a smooth running and dependable manner and lets the vehicle occupant who performs the opening and closing movements experience technology interactively.

This object has been achieved in accordance with the present invention so that by pivoting the actuating lever in a first direction, the top receptacle cover is moved from a closed position into an open position by the displacement device cooperating therewith, a first coupling element operatively connected with the displacement device takes up a receiving position in which a second coupling element provided on the top engages the first coupling element when the top is in the second operating position, and, by repeated pivoting of the actuating lever into a second, reversed direction, an engaged coupling moves the top receptacle cover and the top together downwardly into the closed position and the third operating position, respectively.

The main advantages achieved with the present invention include the arrangement of only one displacement device acting on the top receptacle cover and a removable coupling between the top and the top receptacle cover, thereby providing an actuation mechanism which, while simply constructed, is easy to operate, shows dependable operation and requires relatively few components and structural space. Thus, a free design of the interior of the passenger compartment is not hampered. In addition, the mechanism is laid out so that the vehicle occupant operating the top is actively involved in the top actuating operation.

By placing the actuating lever, only one of which is required, on the movable upper displacement rail of the seat, the actuating lever can be functionally correctly reached in every seat position of the longitudinally adjustable driver's seat. The hydraulic system provided between the actuating lever and the displacement device performs the transmission operations excellently and is easy to install. In contrast to straight extending traction cables, the connecting lines can have any desired course between the actuating lever and the displacement device.

Large forces can be absorbed and transferred to the body by the frame-like embodied bearing bracket. The lateral elements of the bearing bracket which are supported on the strut domes, together with the center element, provide an additional stiffening of the rear part of the motor vehicle.

The displacement device contains only a few components which can be produced simply and cost-effectively. Tolerance between the body and the displacement device can be compensated in a simple manner by the two-piece embodiment of the guide levers, so that a trouble-free operation of the displacement device is possible at all times. The removable coupling between the top and the top receptacle cover is easy to produce but highly effective. The first coupling element which cooperates with the top receptacle cover has a projection which prevents erroneous operation of the top if the top receptacle cover is not completely opened.

A pivotable locking system, which cooperates with the hydraulic system, is provided on the operating lever of the displacement device and, together with a locking hook of the top receptacle cover, forms a simple top receptacle cover lock.

BRIEF DESCRIPTION OF THE DRAWINGS

These and other objects, features and advantages of the present invention will become more readily apparent from the following detailed description thereof when taken in conjunction with the accompanying drawings wherein:

FIG. 8 is a partial side view of components of the displacement device in the closed position of the top receptacle cover on an enlarged scale;

FIG. 9 is a sectional view along line IX—IX of FIG. 8 but on an enlarged scale;

DETAILED DESCRIPTION OF THE DRAWINGS

Figure 1:
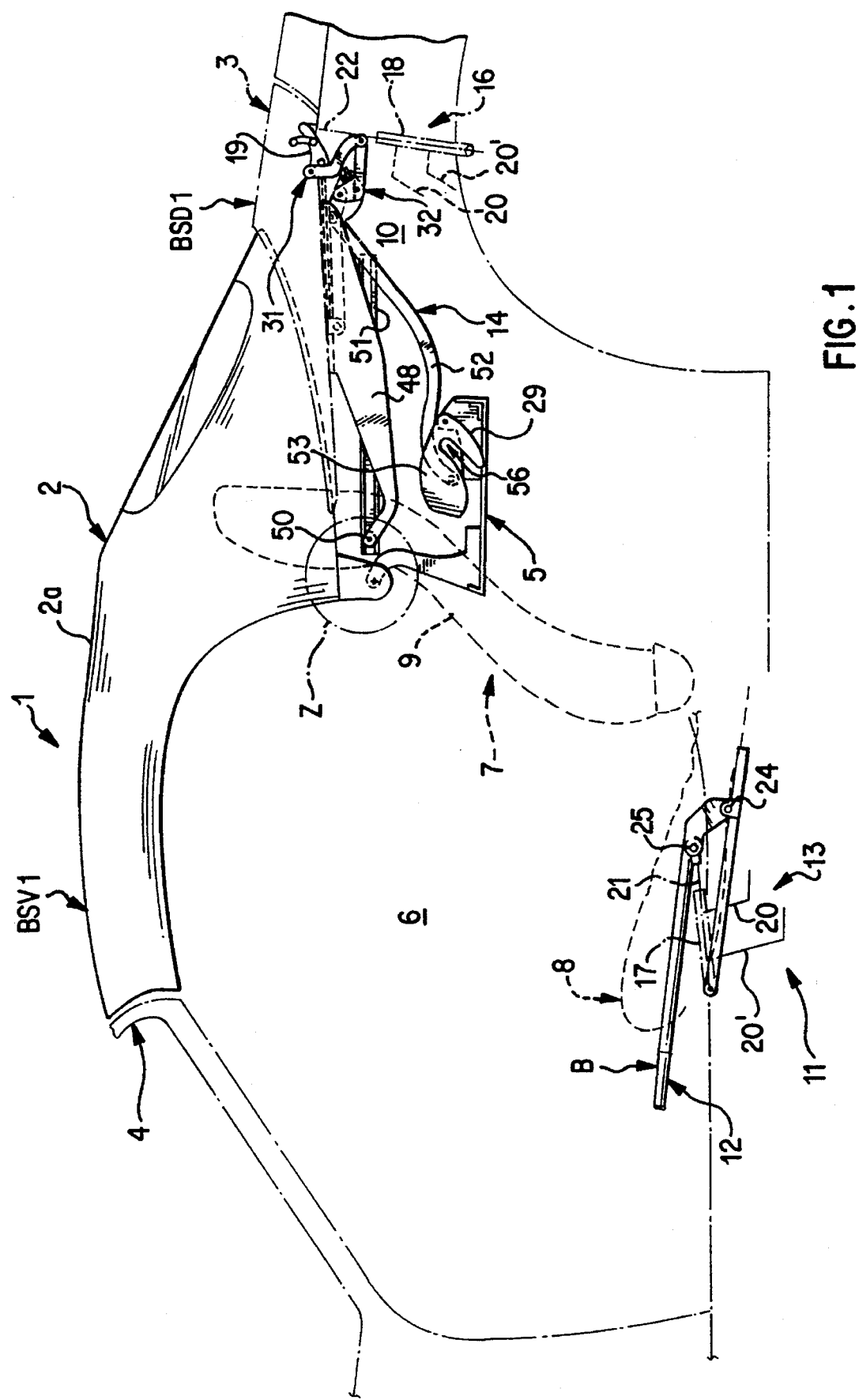
FIG. 1 is partial side view of an actuation mechanism for a top and a top receptacle cover of a motor vehicle, wherein the top receptacle cover has taken up its closed position and the top its first operation position.

FIG. 1 shows a partial portion of a motor vehicle 1 represented by a two-seater passenger car which has a top 2 and a top receptacle cover 3 in the portion shown.

In a first operational position BSV1 (closed position), the collapsible top 2 extends between a windshield frame 4 and a front edge area of the top receptacle cover 3. In its first operational position BSV1, the top 2 is maintained in its position on the windshield frame 4 by releasable closures (not shown in detail).

Figure 5:
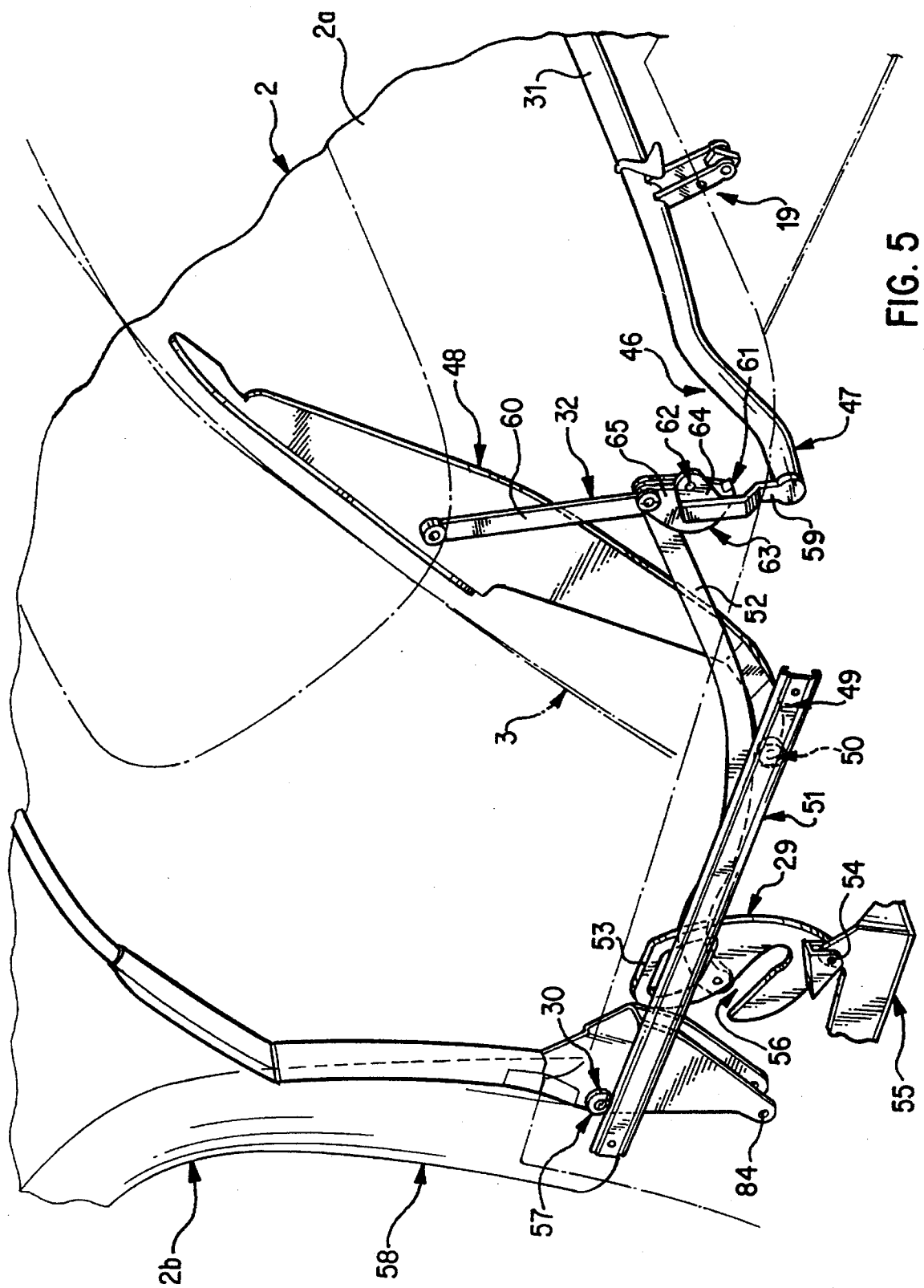
FIG. 5 is a perspective view from the rear of the displacement device of the actuation mechanism in the open position of the top receptacle cover.

In FIG. 5, the top 2 is conventionally composed of a top cover 2a and top rods 2b, with the top rods 2b being hinged on both long sides of the vehicle on top bearings 5 on the body.

As seen in FIGS. 1 to 4, seats 7 are disposed inside a passenger compartment 6. Each seat 7 comprises a seat element 8, adjustable in the longitudinal direction of the vehicle, and a pivotable seat back 9. Both seats 7 are connected with the vehicle body (floor) via longitudinally oriented guides.

Figure 4:
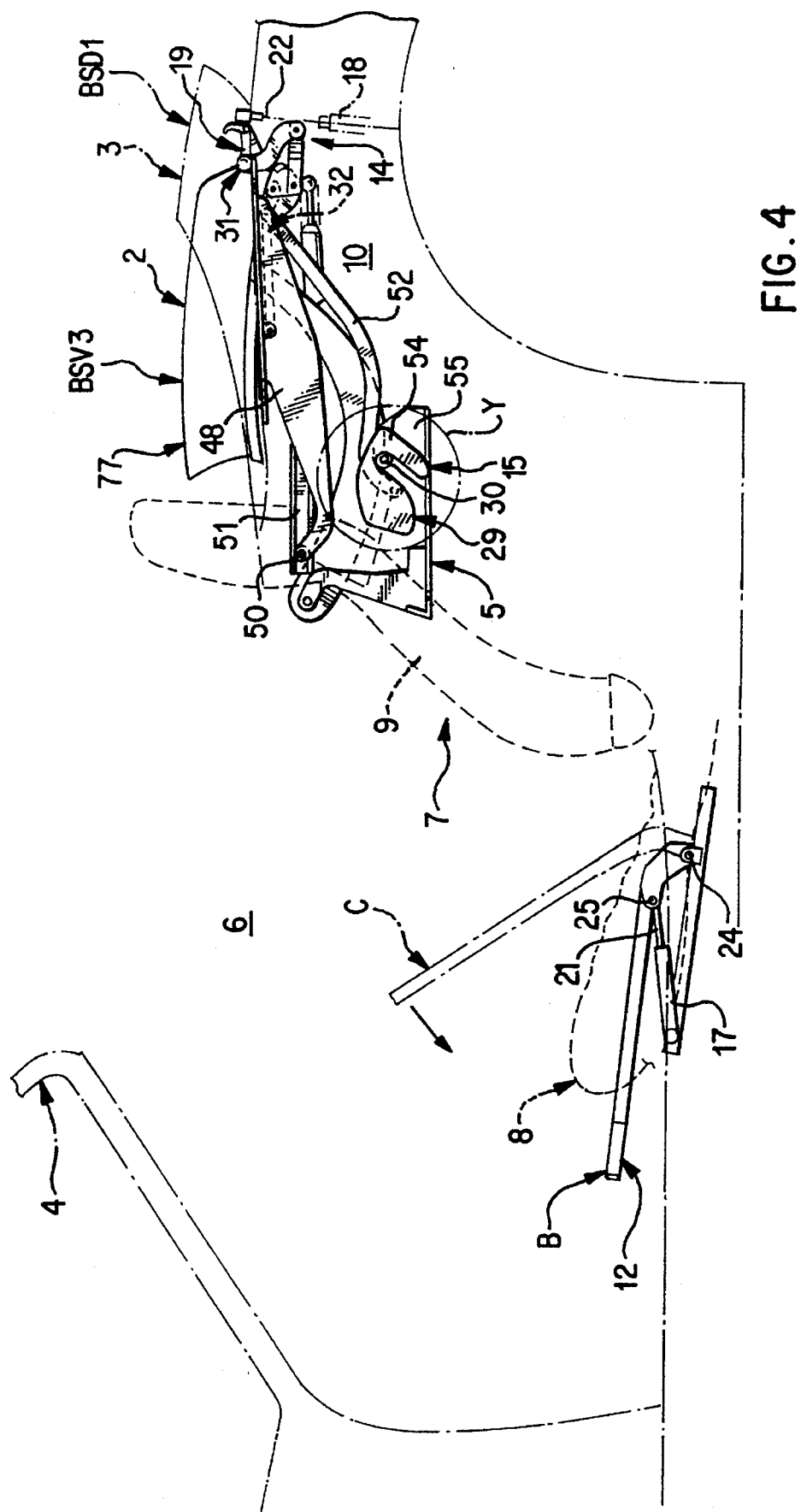
FIG. 4 is a partial side view of the actuation mechanism for the top and the top receptacle cover, wherein the top has taken up its third operation position and the top receptacle cover has taken up its closed position.

Each seat guide has a first stationary seat rail fastened to the floor which is operatively connected in a conventional manner which need not be shown in detail, with a second seat rail fastened to the adjustable seat element 8. A cover receptacle 10 for the lowered reception of the collapsed top 2 is provided behind the two seats 7. The top receptacle 10 is at least partially covered toward its top by the top receptacle cover 3. With reference to FIG. 4, a rearward pivoted front top section 77 of the top 2 covers a large-surfaced area of the top cover 10 located in front of the top receptacle cover 3 and in this area forms an upper cover.

Figure 2:
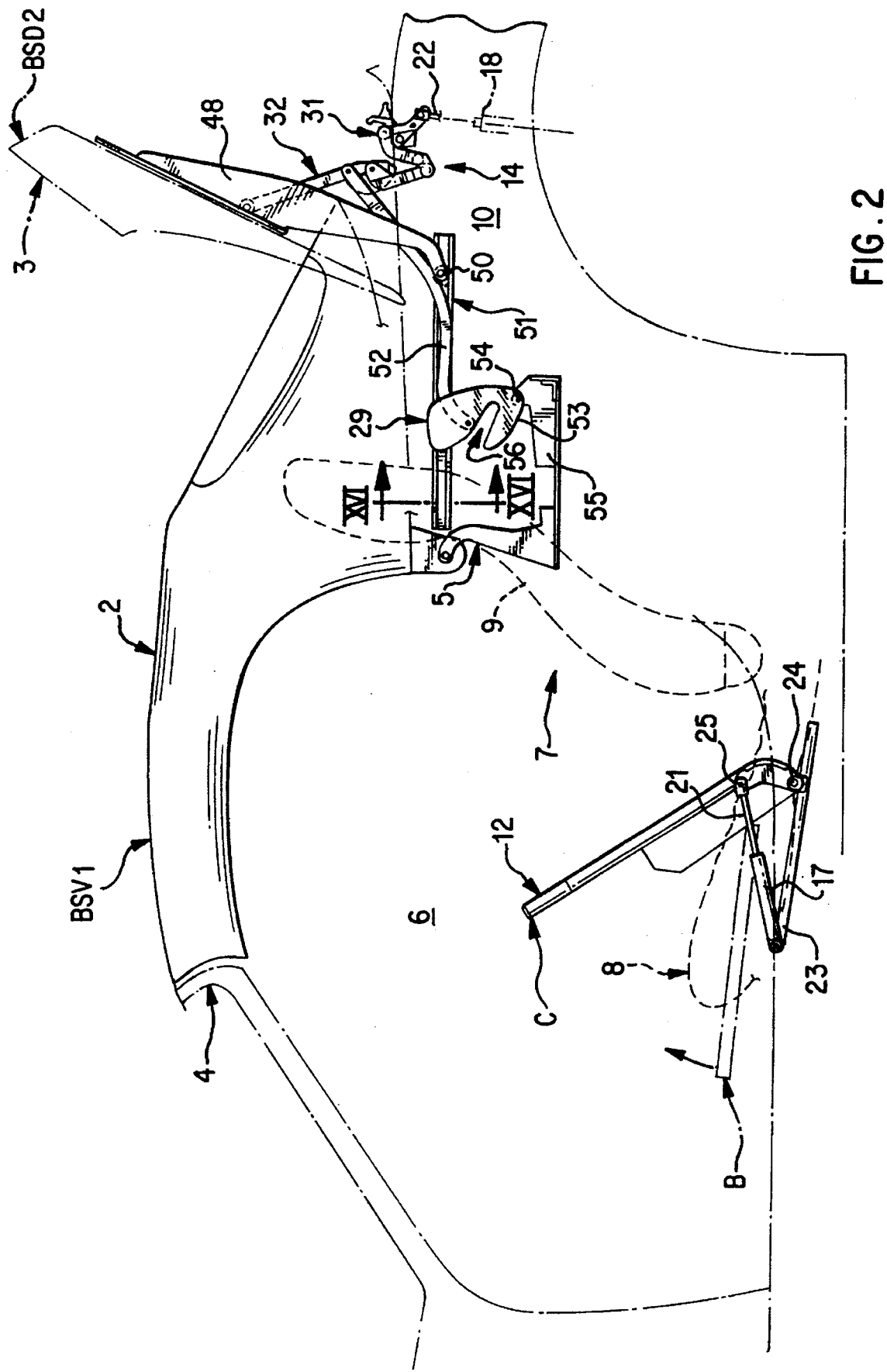
FIG. 2 is a partial side view of the actuation mechanism for the top and the top receptacle cover, wherein the top receptacle cover has taken up its open position and the top has taken up its first operation position.
Figure 3:
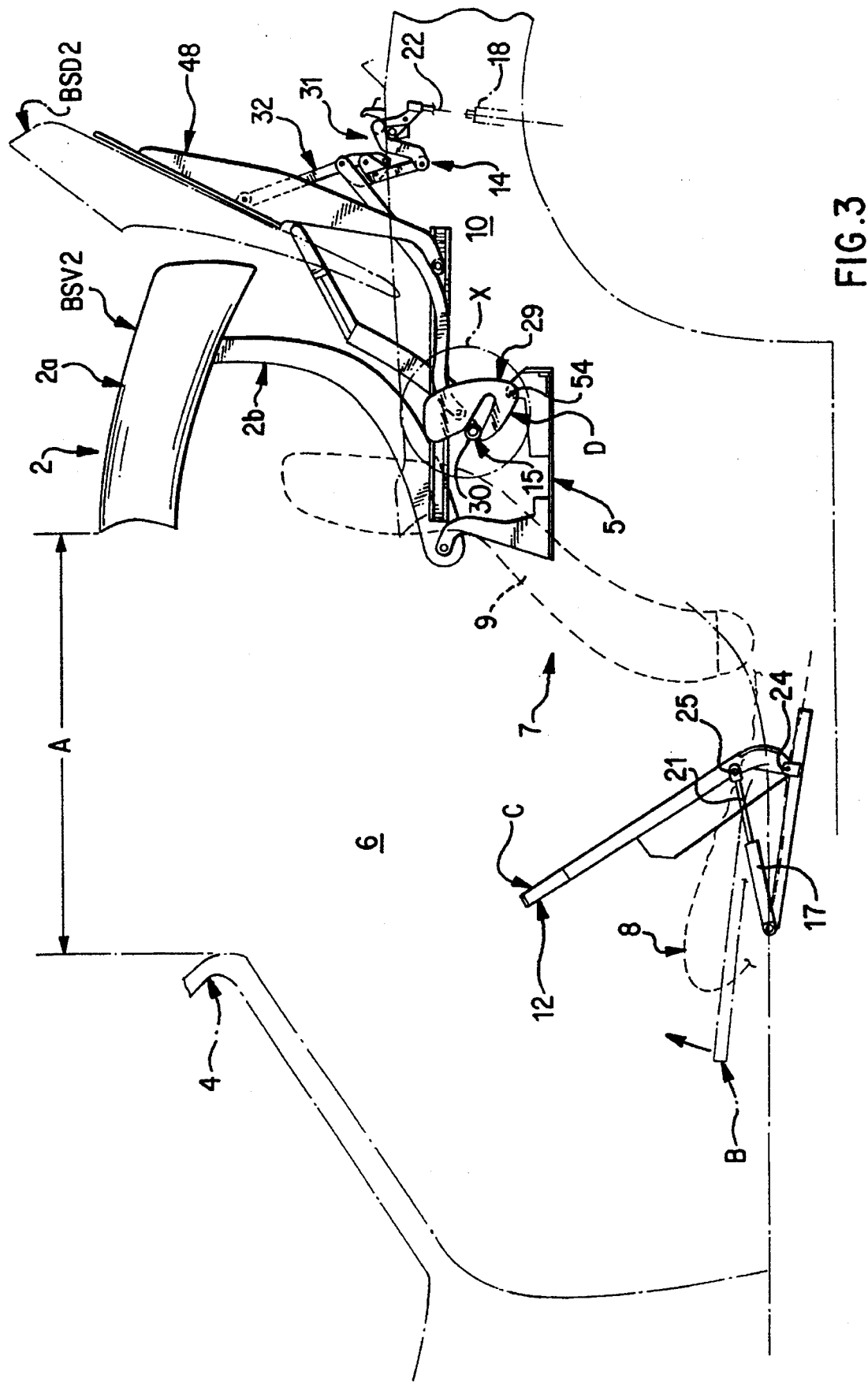
FIG. 3 is a partial side view of the actuation mechanism for the top and the top receptacle cover, wherein the top receptacle cover has taken up its open position and the top has taken up its second operation position.

The top 2 can be moved backward from a first operating position BSV1 (the closed position shown in FIGS. 1 and 2) through a second operating position BSV2 (the intermediate position shown in FIG. 3) into a third operating position BSV3 (the stored position shown in FIG. 4) and vice versa. The top receptacle cover 3 can be moved between a closed position BSD1 (FIGS. 1 and 4) and an open position BSD2 (FIGS. 2 and 3). The top 2 is pivoted backward by an amount A from the windshield frame 4 in the second operating position BSV2 (FIG. 3).

The top receptacle cover 3 can be moved from the closed position BSD1 into an open position BSD2, and the top 2 from the second operating position BSV2 into the third operating position BSV3 and vice versa directly from the driver's seat 7 by way of an actuation mechanism 11 which comprises an actuating lever 12 disposed in the passenger compartment next to the driver's seat 7. The actuating lever 12 is connected via a transmission element 13 with a displacement device 14, disposed next to the top receptacle cover 3. The actuation mechanism also includes a removable coupling 15. The transmission element 13 between the actuating lever 12 and the displacement device 14 can be effected mechanically, hydraulically, pneumatically or electrically.

In the illustrated embodiment, the transmission element 13 is formed by a hydraulic system 16 in the form of a closed master/slave cylinder system without a compensator reservoir. The master cylinder 17 of the hydraulic system 16 cooperates with the actuating lever 12, and the slave cylinder 18 is in operative connection with an operating lever 19 of the displacement device 14. The master cylinder 17 and the slave cylinder 18 are connected with each other by two separate hydraulic lines 20, 20'. The master cylinder 17 has a movable piston rod 21 and the slave cylinder 18 has a movable piston rod 22 (FIG. 1).

In FIG. 2, the master cylinder 17 is seated on a base plate 23 which also supports the pivotable actuating lever 12. A free end 25 of the piston rod 21 is hingedly connected with the pivotable actuating lever 12 above a pivot shaft 24 of the actuating lever 12. In the approximately horizontally oriented rest position B of the actuating lever 12 shown in FIG. 1, the piston rod 21 is in its maximally retracted position, while the piston rod 22 of the slave cylinder 18 takes up its maximally extended position.

The slave cylinder 18 is rotatably seated in a receiver 26 of a bearing bracket 27. The free upper end of the piston rod 22 cooperates via a transversely extending bolt 28 with the fork-shaped operating lever 19 of the actuation mechanism 14. The actuating lever 12, which can be operated from the driver's seat 7, is preferably disposed on the longitudinally movable seat element 8, in which the base plate 23 which receives the pivotable actuating lever 12 is fastened to the upper, movable seat rail. This fastening can be provided by screws, rivets, welding or the like as most clearly seen in FIGS. 8, 12 and 8.

In the closed position BSD1 of the top receptacle cover 3, the actuating lever 12 is oriented approximately horizontally and takes up the aforementioned rest position B. The actuating lever 12 extends between the outside of the seat 7 and the adjoining door sill located on the outside (not shown in detail). Similar to a hand brake lever, the actuating lever 12 is locked in its rest position, i.e. it can only be pivoted after locking has been released.

The top receptacle cover 3 is moved upward and back into the open position BSD2 by the displacement device 14 cooperating with it when the actuating lever 12 is pivoted in a first direction as shown in FIGS. 2 and 3. In the course of this operation, the actuating lever 12 is pivoted upward into an angled active position C in accordance with FIG. 2.

In accordance with FIG. 1, the top receptacle cover 3 is oriented approximately horizontally in the closed position BSD1, and takes up an upright position extending obliquely upward and toward the back in the open position BSD2 shown in FIGS. 2 and 3. In the open position BSD2 of the top receptacle cover 3, a first coupling element 29 of the removable coupling 15, which is in operative connection with the displacement device 14, takes up a receiving position D, in which a second coupling element 30 provided at the top 2 can engage the first coupling element 29 when the top is in the second operating position BSV2 seen in FIG. 3.

By renewed pivoting of the actuating lever 12 from the angled active position C in a second, reverse downward direction into the rest position B, the top receptacle cover 3 and the top 2 are moved together downward into the closed position BSD1 and the third operating position BSV3 by the engaged coupling 15 as shown in FIG. 4. In the third operating position BSV3, the top 2 is contained in the top receptacle 10 at the back and is covered, at least sections thereof, by the top receptacle cover 3. After releasing the closures, which are conventional and not shown in detail, on the windshield frame, the top 2 is manually moved from the first operating position BSV1 (FIG. 2) into the second operating position BSV2 (FIG. 3).

Figure 6:
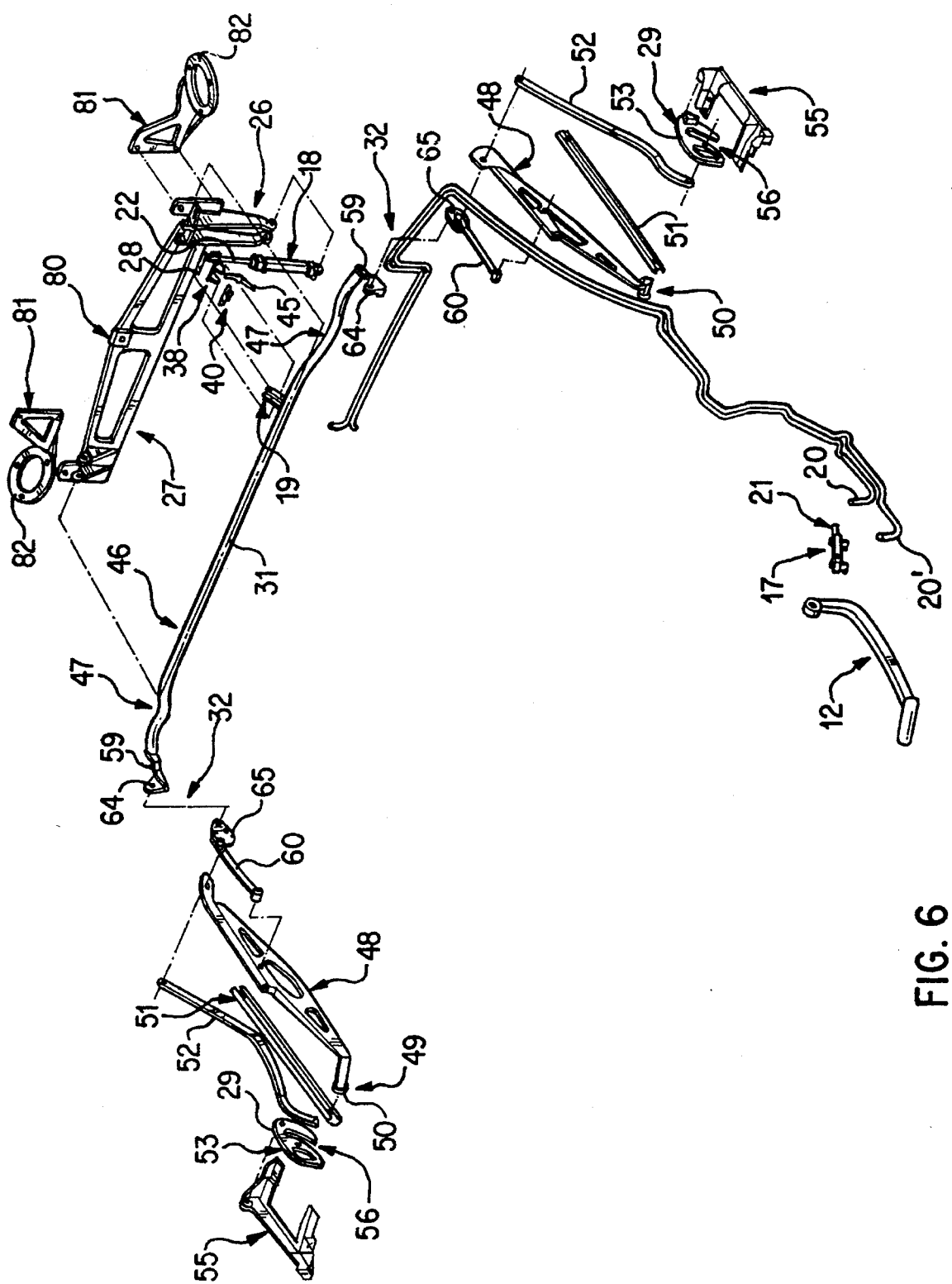
FIG. 6 is an exploded perspective view of the individual elements of the actuation mechanism.
Figure 7:
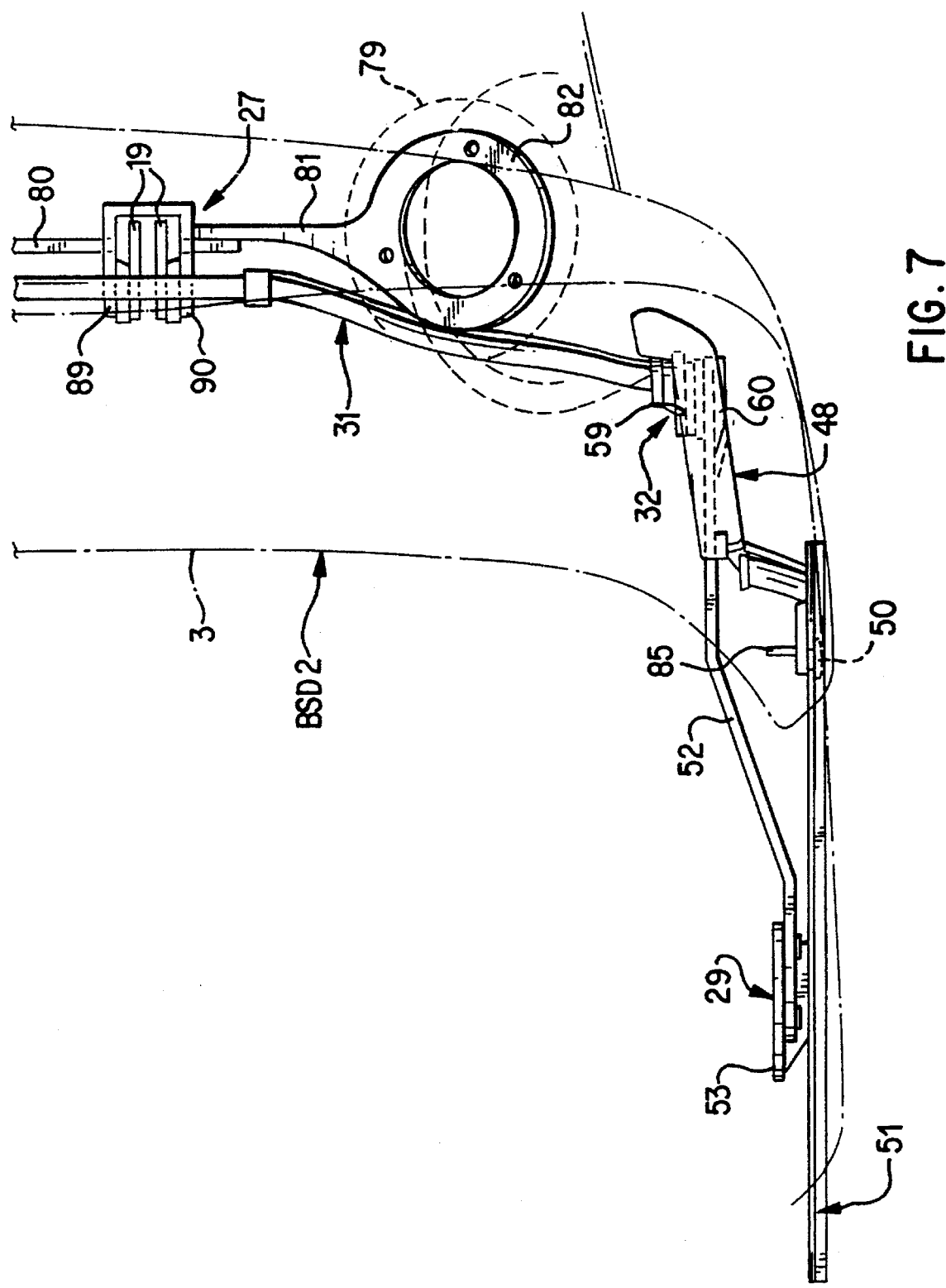
FIG. 7 is a partial top view of the actuation mechanism and the top receptacle cover in the open position of top receptacle cover.

The displacement device 14 comprises, as best seen in FIGS. 5 and 6, a transverse tube 31 which is fixedly connected with a fork-shaped operating lever 19 and rotatably seated on the bearing bracket 27 and is hingedly connected at its two long sides with the top receptacle cover 3 via a guide lever 32. One end 33 of the fork-shaped operating lever 19 is fixedly connected by welding with the transverse tube 31 and is hingedly connected via a transversely extending bolt 34 with the existing bearing bracket 27. The transverse tube 31 extends at a distance F from the bolt 34 as seen in FIG. 8. An elongated leg 35 of the operating lever 19 extends away from the transverse tube 31 and has an oblong slit opening 37 on its free end 36. The bolt 28 which is connected with the piston rod 22 is displaceably guided in an upward direction in the opening 37. The bolt 28 cooperates with a locking element 38 of a locking device 39 for the top receptacle cover 3.

The locking device 39 consists of a stationary locking hook 40, disposed on the interior sheet metal of the top receptacle cover 3, and the pivotable, spring-loaded locking element 38, which is rotatable around a transverse shaft 41 and seated on the operating lever 19. The angle-shaped locking element 38 reaches around and behind the bolt 28 with one leg 42. With the top receptacle cover 3 locked (locked position G), the bolt 28 rests against the upper end of the slit opening 37. With the top receptacle cover 3 locked, the transversely extending pin 43 pushes against the locking hook 40 of the locking element 38 from above. When the top receptacle cover 3 is opened, the piston rod 22 of the slave cylinder 18 is moved downward by a small amount. As a result, the bolt 28 slides downward in the slit openings 37 and pivots the leg 42 of the locking element 38 which causes the other leg 44 of the locking element 38 to be moved in a clockwise direction and be disengaged from the locking hook 40 (unlocked position shown by dot-dash lines H). The top receptacle cover 3 is moved into its open position BSD2 by further retraction of the piston rod 22. A leg spring 45 of the locking element 38 encloses sections of the transverse shaft 41 and is supported at its ends on the pin 43 and the bolt 34, again as best seen in FIG. 8.

In addition to being connected to the operating lever 19, the transverse shaft 41 is hingedly connected with the stationary bearing bracket 27 via a holder 46 extending at a distance from the operating lever 19. The shaft formed by the bolt 34 forms the stationary rotating shaft of the displacement device 14. Between the holder 46 and the operating lever 19, the transverse tube 31 is configured approximately straight and is approximately horizontally aligned. Outside of the two seating points, sections of the transverse tube 31 are bent and straight end areas adjoin these bent sections 47. The end areas of the transverse tube 31 are rigidly connected with the guide levers 32.

Figure 16:
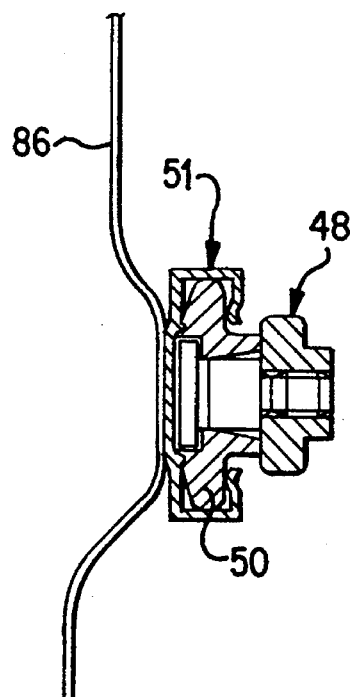
FIG. 16 is a sectional view along line XVI—XVI of FIG. 2 but on an enlarged scale.

In addition, the displacement device 14 comprises an elongated guide arm 48 on each long side of the top receptacle cover 3 and fastened on the underside of the top receptacle cover 3. An area 49 of the guide arm 48 projecting past the front of the top receptacle cover 3 is provided with a rotatable roller 50 which cooperates with an elongated guide rail 51 fixed on the body. In cross section as seen in FIG. 16, the guide rail 51 has an approximately C-shaped profile and the roller 50 is rotatably received inside the guide rails 51. The guide rail 51 is fastened by screws or the like at several points on an upright wall of the body. Seen in a side view, the guide rail 51, which extends horizontally in the longitudinal or driving direction of the vehicle, is disposed so that the open side of the upright C-profile faces the roller 50 which is located on the inside.

A push rod 52 extends away from the guide lever 32 and is rotatably connected with respectively the first coupling element 29 and the guide lever 32.

Figure 10:
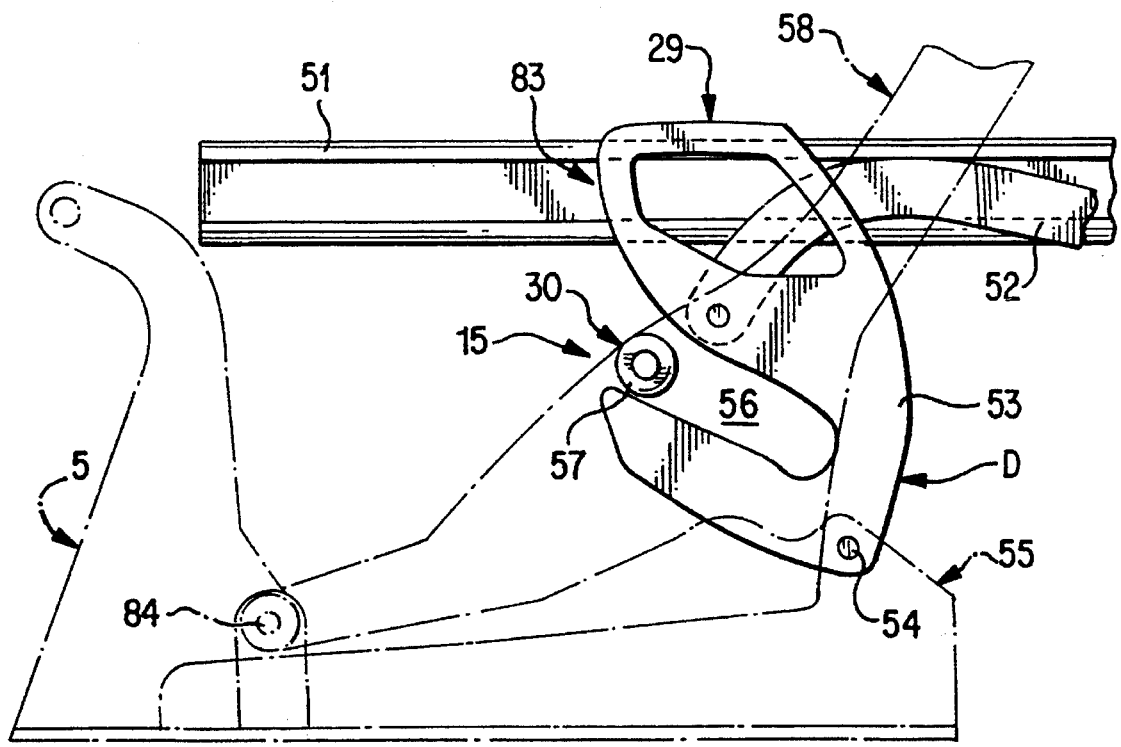
FIG. 10 is a detail X bounded by a dot-dash circle in FIG. 3 but on an enlarged scale.

The first coupling element 29 is constituted by a pivotable rocker arm 53, which is rotatably seated around a transversely extending rotating shaft 54 of a bracket 55 and has an oblong slit opening 56 open on one side and engageable or disengageable by the second coupling element 30 as seen in FIG. 10. An upper and a lower border of the slit opening 56, respectively have a bent shape. Seen in the upright direction, the slit opening 56 is sized to be slightly larger than the second coupling element 30. A gas spring can be provided for aiding the pivot movement of the rocker arm 53 and is hinged by one end on the rocker arm 53 and by the other on the body in a generally known manner and therefore not shown in detail.

Figure 17:
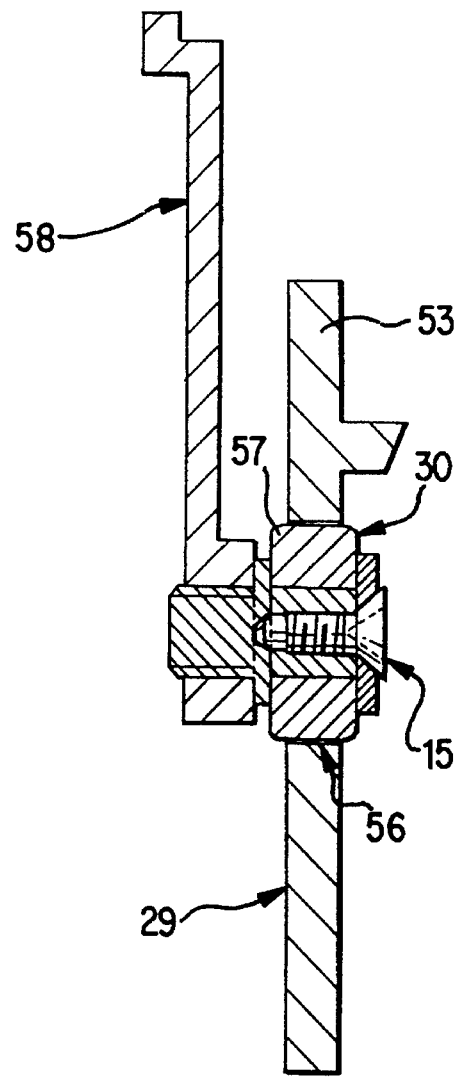
FIG. 17 is a sectional view along line XVII—XVII of FIG. 11 but on an enlarged scale.

The slit opening 56 widens toward the open side. Consequently, the insertion of the second coupling element 30 into the first coupling element 29 is made easier. The second coupling element 30 is formed by a rotatable roller 57 fastened on the top 2, and disposed on the exterior of the main hoop 58 of the top 2 to extend in the direction toward the first coupling element 29 as best seen in cross-section in FIG. 17. The main hoop 58 can be pivoted at point 84 around a transversely extending rotational shaft of the top bearings 5. The bracket 55 for the rocker arm 53 is fastened on the top bearings 5.

The guide lever 32 can be configured in one or several pieces. In the illustrated embodiment and referring specifically to FIG. 8, solely for exemplary purposes, the guide lever 32 is composed of two guide pieces 59, 60, with an adjustment device 61 provided in the common connection area. The relative position of the two guide pieces 59, 60 can thus be changed with respect to each other to a defined extent for compensating tolerances between the body and the displacement device 14. Both guide pieces 59, 60 act together via a hinged connection 62 and a screw connection 63. A first plate 64 is welded to the end of the first, shorter guide piece 59 facing away from the transverse tube 31 and rests on a second plate 65 of the other guide piece 60.

Seen from above the vehicle, the first guide piece 59 is offset, wherein the end connected with the first plate 64 is laterally located further outward than the end connected with the transverse tube 31. Seen in a side view, the first plate 64, located on the inside, is smaller than the second plate 65, located on the outside.

The screw connection 63.between the two guide pieces 59, 60 is provided in the area of the two plates 64, 65. Referring to FIG. 9, the fastening screw 67 is brought in from the outside through an oblong slit opening 66 and, with a threaded section 68, is screwed into a threaded bore 69 of the first plate 64 or of the first guide piece 59. The screw head is supported on the exterior of the second plate 65. By virtue of the oblong slit opening 66, the two plates 64, 65 can be displaced relative to each other. The hinged connection 62 comprises a pin 70 which is passed through corresponding cylindrical bores 71, 72 of the two plates 64, 65 as well as of the second guide piece 60.

A threaded bore 74, into which an adjusting screw 75 has been screwed, is provided on a transversely extending detached wall 73. With its end facing away from the head, the adjusting screw 75 cooperates with a rim section 76 of the first plate 64.

Figure 18:
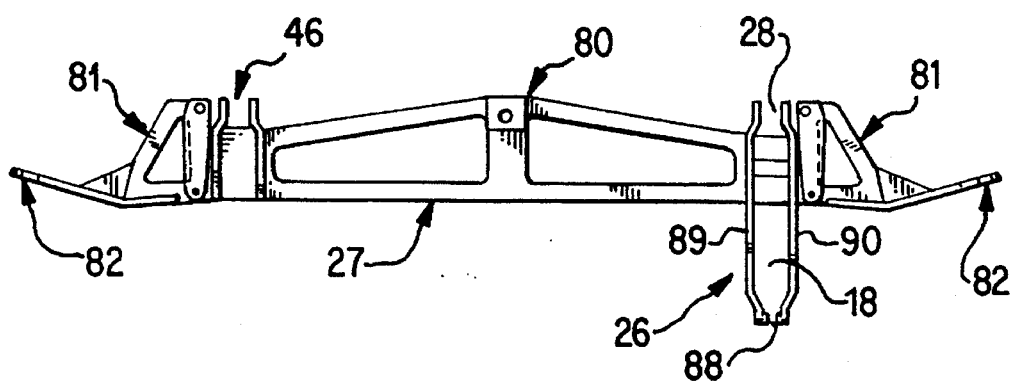
FIG. 18 is a frontal view of the seating device.
Figure 19:
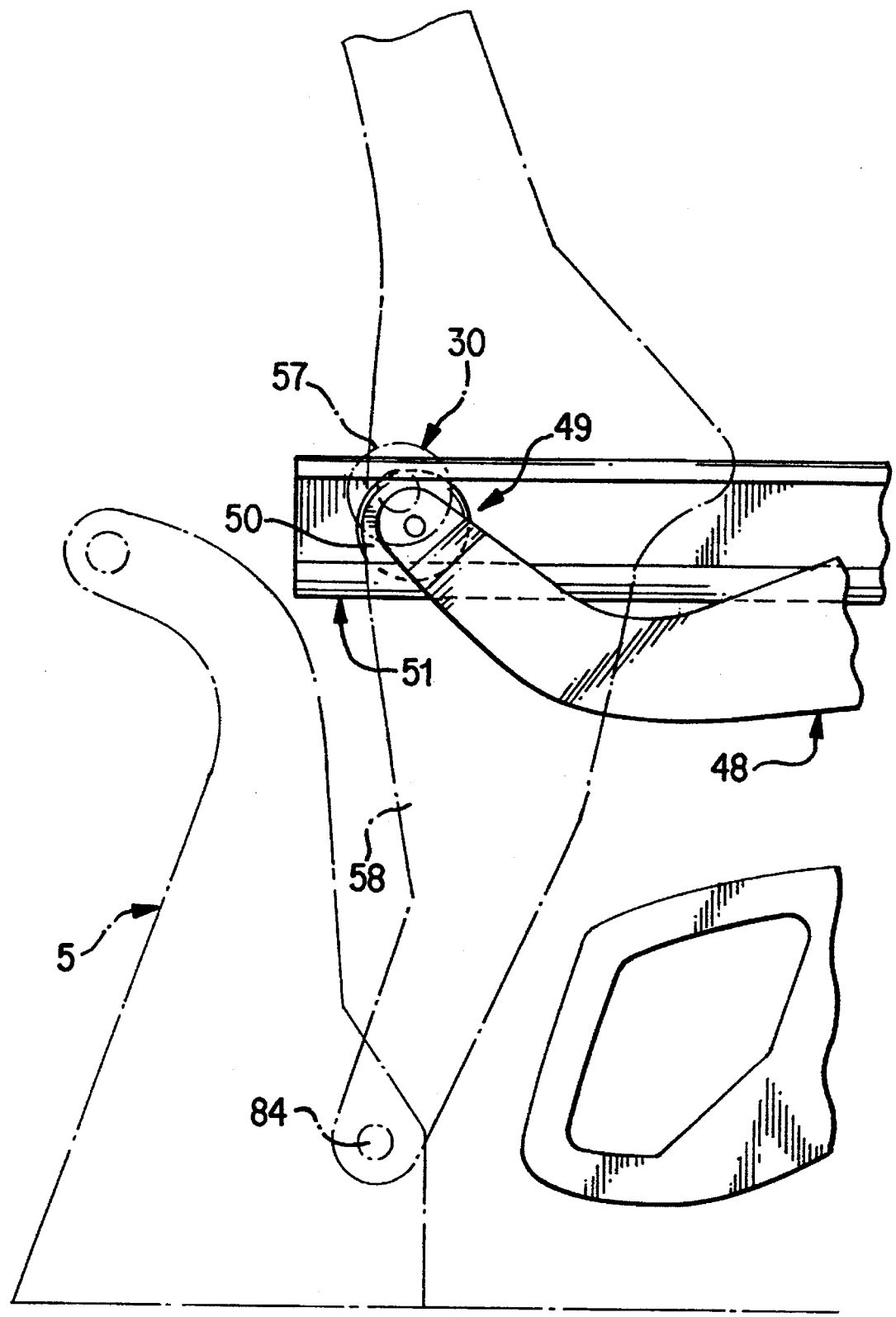
FIG. 19 is partial view similar to FIG. 11 but on a further enlarged scale.

The multi-piece bearing bracket 27 shown in FIG. 18 is supported and fastened on a transversely extending rear wall (not shown in detail) of the top receptacle 10 and on the top of strut domes situated laterally on the outside. The bearing bracket 27 comprises a center part 80, embodied as a distortion-free support structure, and two lateral parts 81, connected by screws with the center part 80. The lateral parts 81 comprise externally located circle-shaped sections 82, which have been placed on the top of the strut domes 79 and connected by screws therewith.

Figure 12:
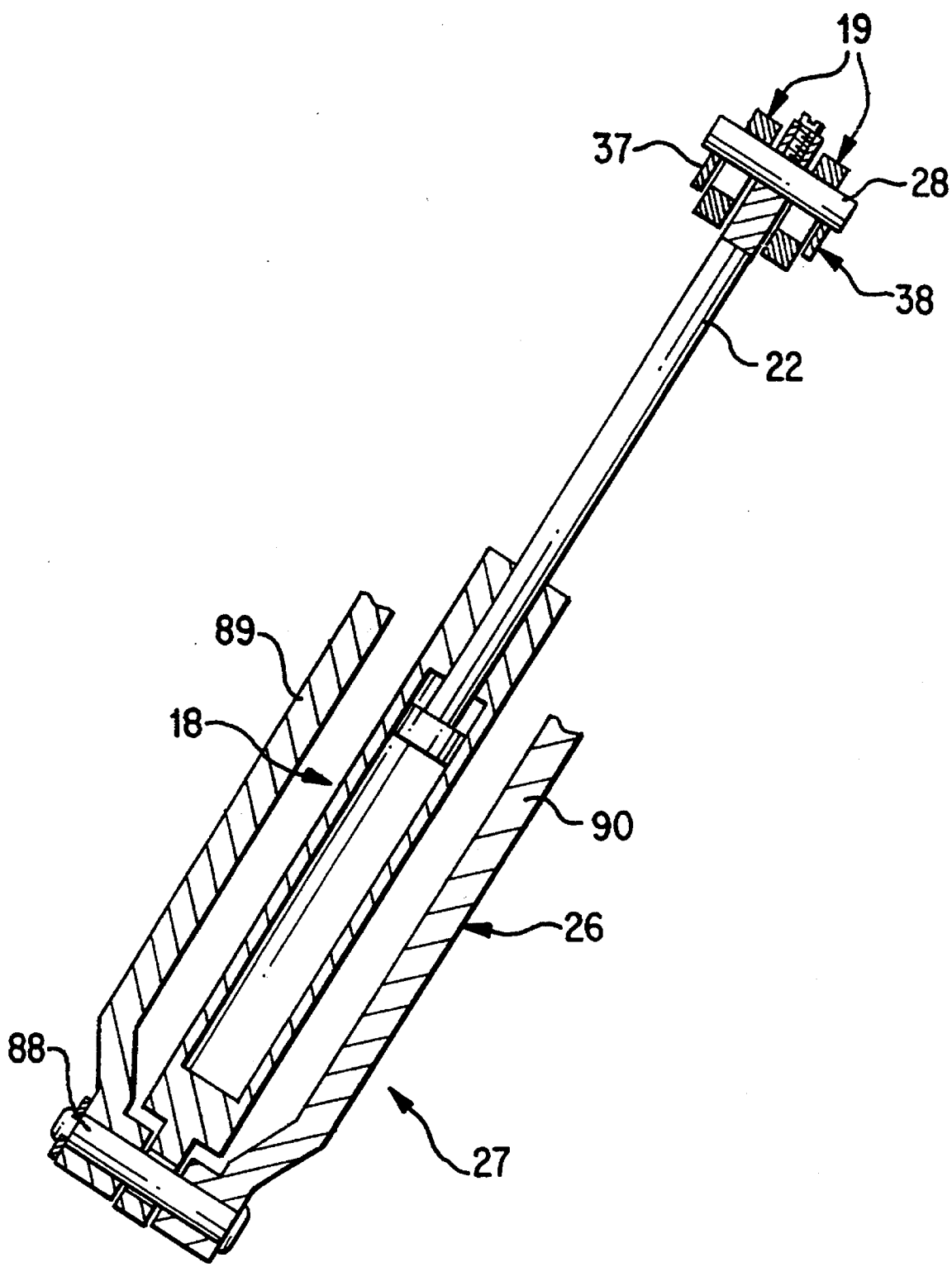
FIG. 12 is a sectional view along line XII—XII of FIG. 8 but on an enlarged scale.

A solid, warp-free support of the displacement device 14 is achieved by the connection of the bearing bracket 27 with the rear wall and the two strut domes 79, by way of which large forces can be absorbed and a stiffening of the rear part of the vehicle is achieved. The upright receiver 26 for the hinged seating of the lower end of the slave cylinder 18 and the operating lever 19 shown in greater detail in FIG. 12 is provided on a laterally outer area of the center part 80 of the bearing bracket 27.

Figure 15:
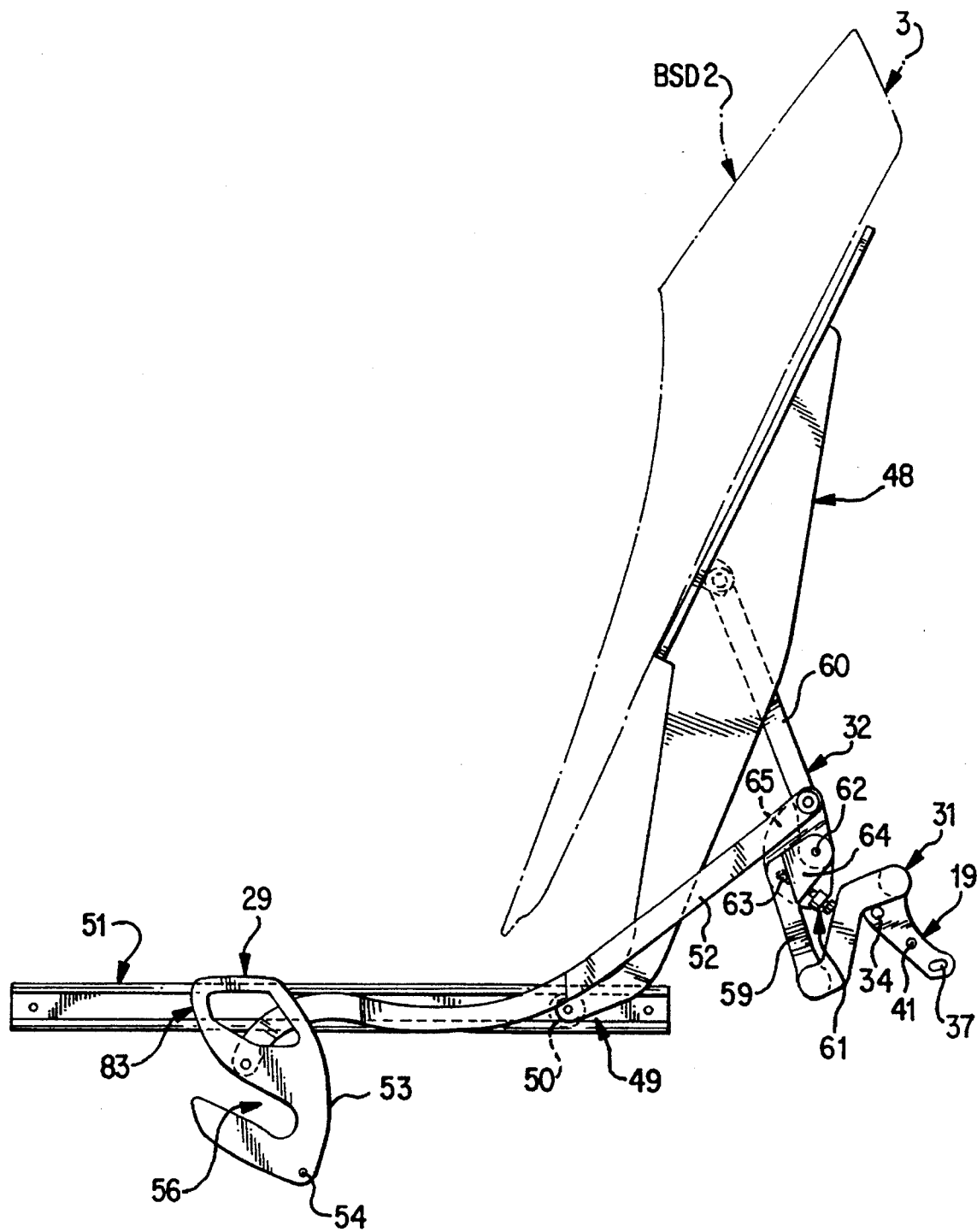
FIG. 15 is a partial side view of the displacement device for the top receptacle cover in the open position of the top receptacle cover, together with the first coupling element.

Referring to FIG. 15, a curved section 83 is formed above the slit opening 56 on the rocker arm 53 to prevent the erroneous operation of the system. That is, when the top receptacle cover 3 is not completely opened, the second coupling element 30 rests against this curved section 83, so that the top 2 cannot be moved further to the rear. The rocker arm 53 is pivoted further only when the top receptacle cover 3 is completely opened (position BSD2 in FIG. 3), and the second coupling element 30 of the top 2 can engage the slit opening 56 of the first coupling element 29. Only then can the top 2 and the top receptacle cover 3 be moved downwardly together.

Figure 11:
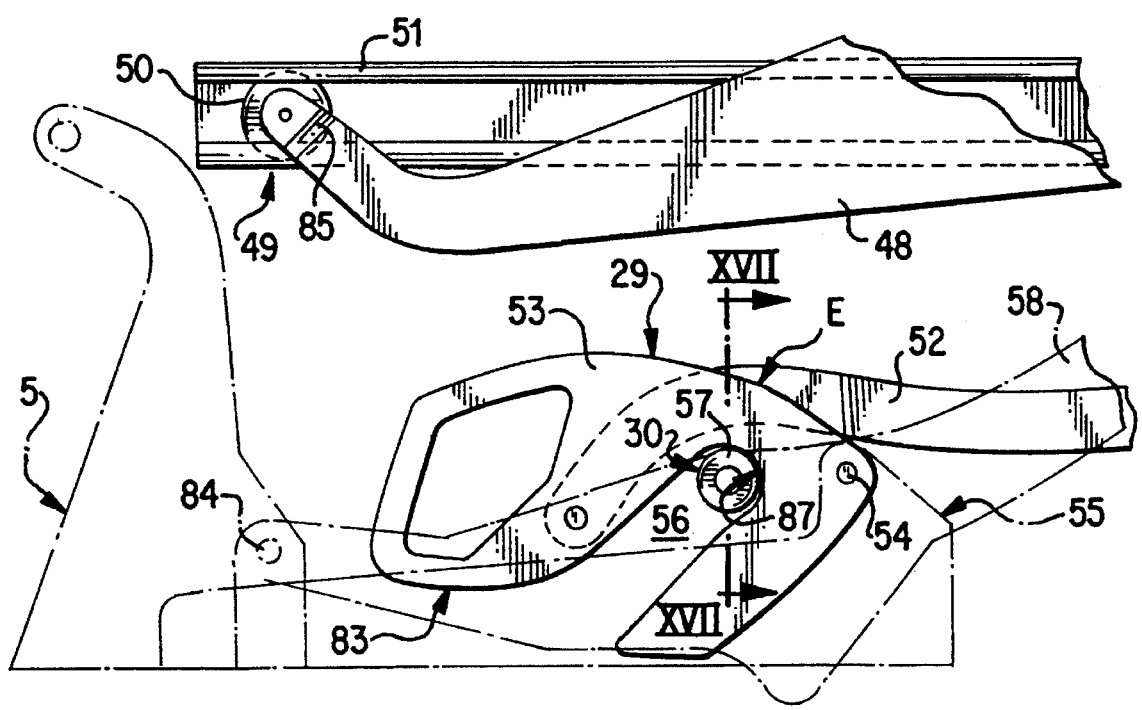
FIG. 11 is a detail Y bounded by a dot-dash circle in FIG. 4 but on an enlarged scale.

In FIG. 11, a transversely extending projecting elbow 85 is attached to the guide arm 48 next to the rotatable roller 50 to prevent the movement of the top 2 from the second operating position BSV2 into the third operating position BSV3 when the top receptacle cover 3 is closed. The receiver 26 shown in FIG. 12 is formed by two vertical, spaced-apart bars 89, 90 between which the lower end area of the master cylinder 18 and the operating lever 19 are received. The master cylinder 18 is hingedly connected via a transversely extending socket pin 88 with the bars 89, 90.

Figure 13:
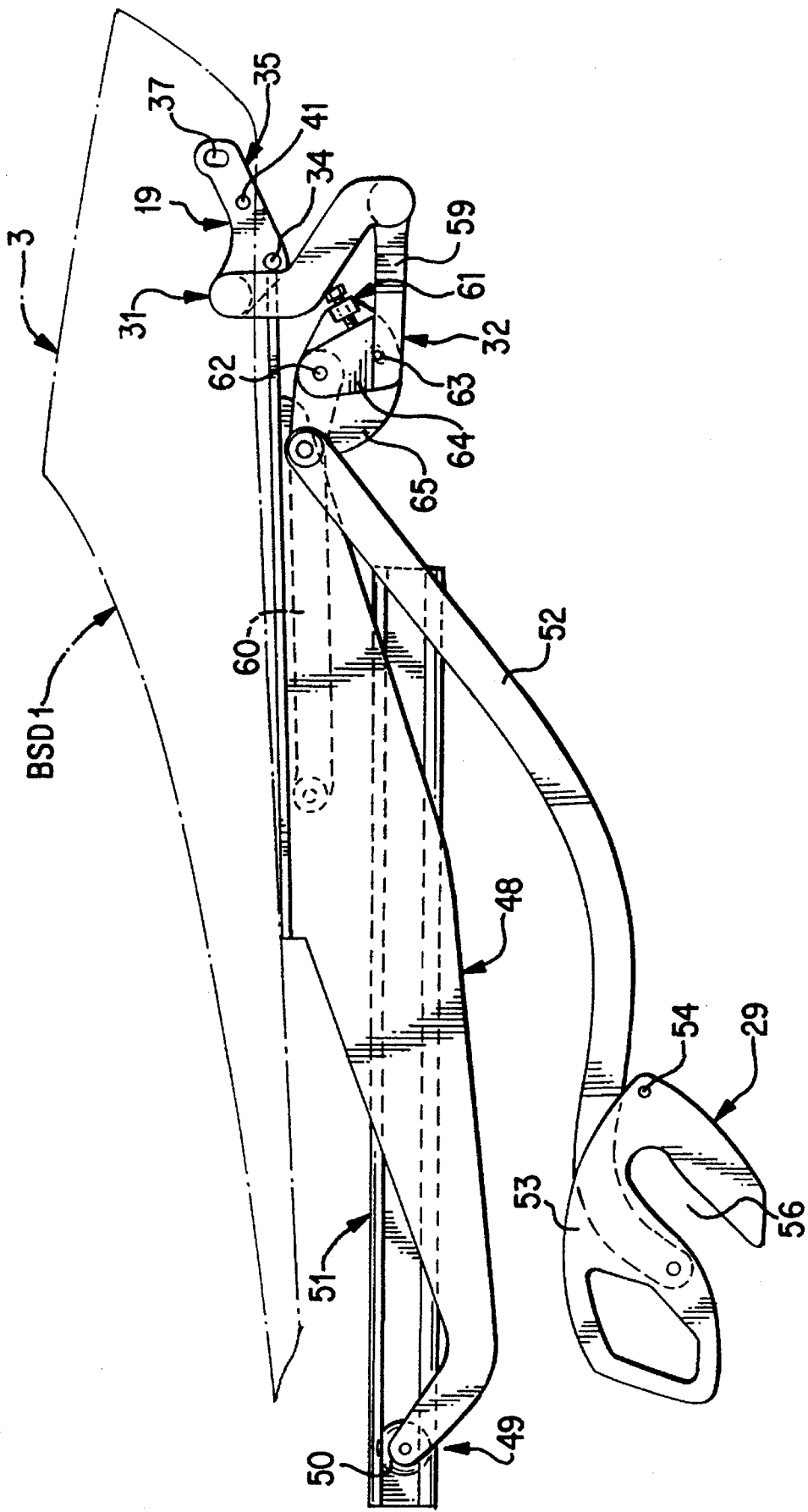
FIG. 13 is a partial side view of the displacement device for the top receptacle-cover in the closed position of the top receptacle cover, together with the first coupling element.

The actuation mechanism 11 for the top 2 and the top receptacle cover 3 function in the following manner. With the top 2 closed (operating position BSV1 in FIG. 1), the top 2 is connected with the windshield frame 4 via the conventional releasable closures and covers the passenger compartment 6 on the top. The top receptacle cover 3 is in its closed position BSD1 (also FIG. 1) and the actuating lever 12 of the actuation mechanism 11 is in its horizontal rest position B. The position of the individual components of the displacement device 14 in the closed position BSD1 of the top receptacle cover 3 is shown in FIG. 13.

The following steps are required for opening and stowing the top 2 in the rear top receptacle 10. First, the closures of the top 2 on the windshield frame 4 are released in a known way. Then the actuating lever 12 is pivoted upward in a first direction (the active position C seen in FIG. 2). These two steps can, of course, also be performed in a reversed sequence.

Pivoting of the actuating lever 12 results in the piston rod 21 of the master cylinder 17 being moved into its maximally extended position and the piston rod 22 of the slave cylinder 18 into its maximally retracted position. The piston rod 22 cooperates via the bolt 28 with the operating lever 19.

Figure 14:
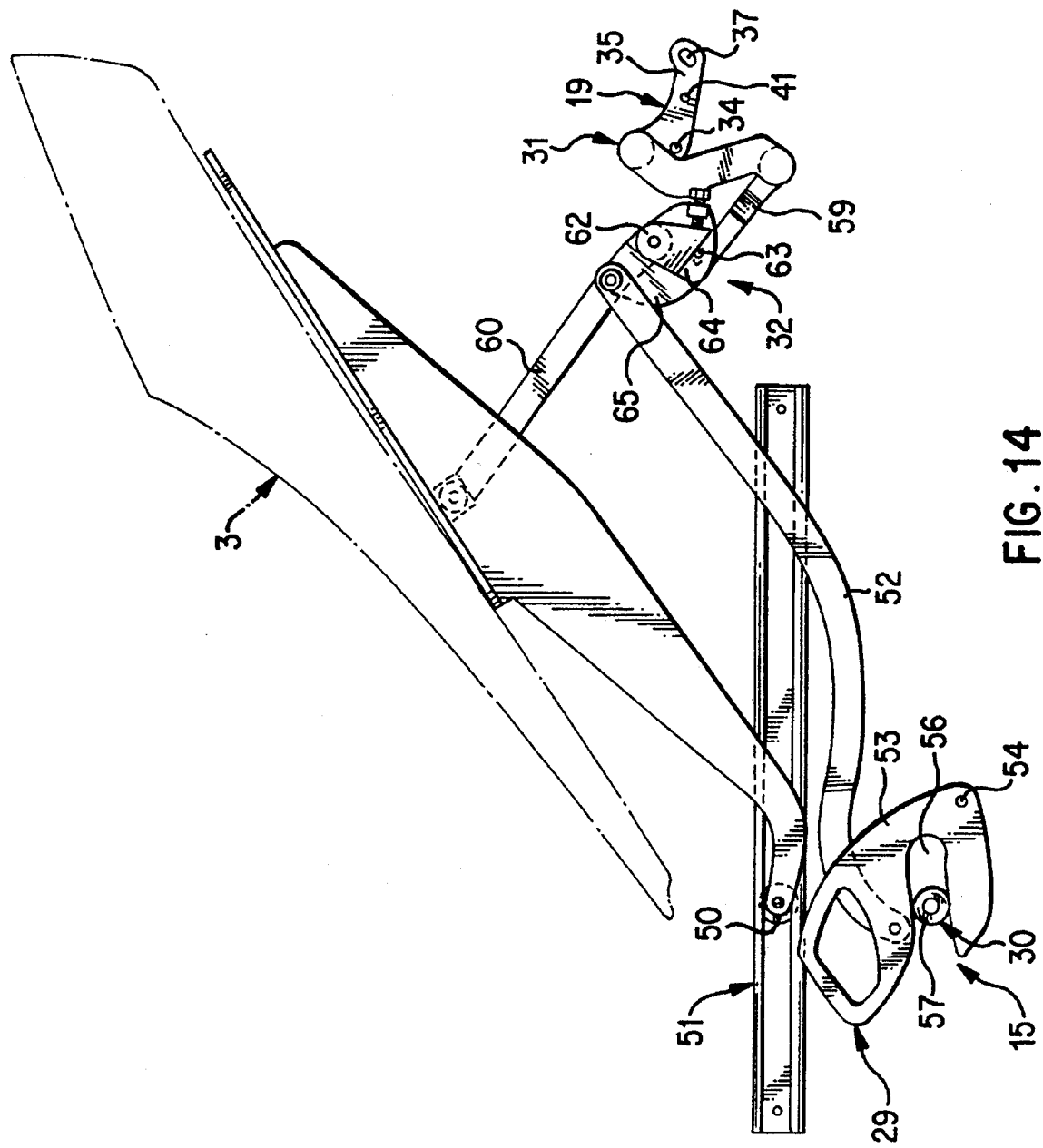
FIG. 14 is a partial side view of the displacement device for the top receptacle cover in a partially raised position (intermediate position) of the top receptacle cover, together with both coupling elements.

Following the unlocking of the top receptacle cover 3, the operating lever 19 is moved clockwise around the bolt 34 serving as a rotational shaft during the pivoting up of the actuating lever 12, and the rear edge of the top receptacle cover 3 is lifted via the transverse tube 31 and the two guide levers 32. The roller 50 of the guide arm 48 slides back in the guide rail 51 until the top receptacle cover 3 takes up its open position BSD2 in FIG. 2. Furthermore, the first coupling element 29 of the coupling 15 is moved into a receiving position D (FIG. 3) by the push rod 52. FIG. 14 shows the position of the displacement device 14 in an intermediate position of the top receptacle cover 3, whereas FIG. 15 shows the position of the displacement device when the top receptacle cover is in the open position BSD2.

Thereafter, the top 2 is manually displaced backward out of the first operating position BSV1 (FIG. 1) into the second operating position BSV2 (FIG. 2), in which the second coupling element 30 provided on the top 2 engages the first coupling element 29. By renewed movement of the operating lever 12 from the angled position C (FIG. 2) in the opposite direction (downward into the rest position B of FIG. 1), the top receptacle cover 3 and the top 2 are together moved downward by the coupling 15 into the closed position BSD2 and the third operating position BSV3 (FIG. 4). During this step, the roller 50 of the guide arm 48 slides forward again in the guide rail 51, the top receptacle cover 3 is lowered, the guide levers 32 are moved from the raised position into an approximately horizontal position and the rocker arm 53 is pivoted by the push rod 52 until the roller 57 extends approximately adjoining a rear end 87 of the slit opening 56 as seen in FIG. 11. Extending the top takes place in a similar but reverse sequence.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An actuation mechanism for a top and a top receptacle cover of a motor vehicle for moving from a driver's seat position, the top receptacle cover between a closed position and an open position and the top between a second operating position and a third operating position, comprising a pivotable actuating lever and a displacement device operatively associated therewith, wherein the actuating lever and displacement device are configured and so operatively connected so that, by pivoting the actuating lever in a first direction, the top receptacle cover is moved from a closed position into an open position by the displacement device cooperating therewith, a first coupling element operatively connected with the displacement device takes up a receiving position in which a second coupling element provided on the top engages the first coupling element when the top is in the second operating position, such that, by repeated pivoting of the actuating lever into a second, reverse direction, an engaged coupling moves the top receptacle cover and the top together downwardly into the closed position and the third operating position, respectively.

2. The actuation mechanism in accordance with claim 1, wherein a transmission element is operatively arranged between the actuating lever and the displacement device, and is one of mechanically, pneumatically, electrically, and hydraulically configured.

3. The actuation mechanism in accordance with claim 2, wherein the transmission element comprises a closed master/slave cylinder hydraulic system, having a master cylinder arranged to cooperate with the actuating lever, and a slave cylinder operatively connected with an operating lever of the displacement device, and the master cylinder and the slave cylinder are operatively connected with each other via two separate hydraulic lines.

4. The actuation mechanism in accordance with claim 3, wherein the master cylinder is arranged on a base plate receiving the actuating lever, and a free end of a piston rod of the master cylinder is hingedly connected with the pivotable actuating lever.

5. The actuation mechanism in accordance with claim 3, wherein the slave cylinder is arranged in a receiver of a bearing bracket, and a free end of a piston rod of the slave cylinder is operatively connected via a bolt with a slit opening of an operating lever of the displacement device.

6. An actuation mechanism for a top and a top receptacle cover of a motor vehicle, comprising an actuation lever arranged to be pivoted from a driver's seat and attached directly to longitudinally displaceable seat element of the driver's seat.

7. The actuation mechanism in accordance with claim 2, wherein the displacement device comprises a transverse tube rotatably received by a bearing bracket and operatively connected via an operating lever with the transmission element, and the transverse tube is hingedly connected on each longitudinal side of the top receptacle cover via a guide lever rigidly connected with the transverse tube, and an elongated guide arm is disposed on each longitudinal side of the top receptacle cover and has a rotatable roller on a free end thereof to displaceably engage a longitudinally oriented guide rail fastened to the vehicle body.

8. The actuation mechanism in accordance with claim 7, wherein the guide lever is hingedly connected, via a push rod, with the first coupling element.

9. The actuation mechanism in accordance with claim 1, wherein the first coupling element is a rocker arm pivotably seated on a bracket fixed on the vehicle body and having an oblong slit opening on one side to be engaged or disengaged by the second coupling element disposed on the top.

10. The actuation mechanism in accordance with claim 1, wherein the second coupling element is a rotatable roller arranged on the top.

11. The actuation mechanism in accordance with claim 10, wherein the first coupling element is a rocker arm pivotably seated on a bracket fixed on the vehicle body and having an oblong slit opening on one side to be engaged or disengaged by the second coupling element disposed on the top.

12. The actuation mechanism in accordance with claim 10, wherein the rotatable roller is arranged on a main hoop of the top in a lower area adjoining a top bearing.

13. The actuation mechanism in accordance with claim 7, wherein the guide lever comprises two interconnected guide pieces arranged to cooperate via a hinged connection and a screw connection, and an adjustment device is operatively arranged between the two guide pieces.

14. The actuation mechanism in accordance with claim 13, wherein the guide pieces each have one plate in a common connecting area, and the plates are placed on each other and are adjustable relative to each other via the adjustment device.

15. The actuation mechanism in accordance with claim 14, wherein the screw connection comprises a fastening screw having a head section supported on an exterior portion of one of the plates is connected with one of the guide pieces and extends through an oblong slit opening of one plate and screwed into a threaded bore of one of the other plate and of the other guide piece.

16. The actuation mechanism in accordance with claim 14, wherein the hinged connection comprises a pin passing through corresponding cylindrical openings of the plates and of one of the guide pieces.

17. The actuation mechanism in accordance with claim 15, wherein the adjustment device comprises an adjusting screw screwably arranged in a threaded bore of a transversely extending wall of the one plate and cooperating via an end thereof facing away from the head section with a rim section of the other plate such that by turning the adjustment screw the one plate can be displaced in relation to the other plate.

18. The actuation mechanism in accordance with claim 5, wherein the bearing bracket consists of several parts for the transverse tube and the slave cylinder, and one side of the bearing bracket is supported in place on a transversely extending rear wall of the top receptacle and another side of the bearing bracket is supported on laterally outside situated strut domes.

19. The actuation mechanism in accordance with claim 18, wherein the bearing bracket has a center part and two lateral parts connected with the center part and two seats for the transverse tube and the receiver for the slave cylinder of the hydraulic system are provided on the center part.

20. The actuation mechanism in accordance with claim 3, wherein a spring-loaded, pivotable locking element of a locking device for the top receptacle cover is seated on the operating lever, and a leg of the locking element is operatively connected via a bolt with the slave cylinder.

21. The actuation mechanism in accordance with claim 7, wherein an end of the guide lever facing away from the transverse tube is rotatably connected with the guide arm.

22. The actuation mechanism in accordance with claim 9, wherein the rocker arm has a curved section above the slit opening which, when the top receptacle cover is not completely opened, cooperates with the second coupling element to prevent a movement of the top from the second operating position into the third operating position.

23. The actuation mechanism in accordance with claim 7, wherein a transversely extending elbow is arranged on the guide arm adjacent to the rotatable roller to prevent a movement of the top from the second operating position into the third operating position when the top receptacle cover is closed.

24. The actuation mechanism for a top and a top receptacle cover of a motor vehicle to allow movement of the top receptacle cover between a closed position and an open position from a driver's seat position, and the top between a second operating position and a third operating position, comprising a pivotable actuating lever and a displacement device operatively associated with the actuating lever, wherein the displacement device acts on the top receptacle cover and is operable via the actuating lever, and the top receptacle cover is connectable with the top via a releasable coupling such that a forced control of the top between the second operating position and the third operating position as a function of the movement of the top receptacle cover occurs via the releasable coupling.

25. A method for actuating an actuation mechanism for a top and a top receptacle cover, comprising the steps of (a) first moving the top receptacle cover from a closed position into a raised open position by pivoting an actuating lever in a first direction, (b) then manually moving back the top, which was unlocked from a frame into a second operating position in which a first coupling element is engaged by a second coupling element, (c) subsequently moving the top receptacle cover and the top downward together into a closed position and a third operating position, respectively, by a renewed pivoting of the actuating lever in a second, reverse direction, (d) and thereafter extending the top in a reverse sequence of steps (a)–(c).

26. An actuation mechanism for a top and a top receptacle cover of a motor vehicle to move the top receptacle cover between a closed position and an open position and the top between a second operating position and a third operating position from a driver's seat position, comprising a pivotable actuating lever and a displacement device operatively connected with the actuating lever, wherein the displacement device is disposed in a back of the vehicle via a closed master/slave cylinder hydraulic system having a compensator reservoir.

\* \* \* \* \*